US008626485B2

(12) United States Patent
Ogihara

(10) Patent No.: US 8,626,485 B2
(45) Date of Patent: Jan. 7, 2014

(54) EMULATION APPARATUS, EMULATOR GENERATING METHOD AND EMULATOR EXECUTING METHOD

(75) Inventor: Takayuki Ogihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 12/552,839

(22) Filed: Sep. 2, 2009

(65) Prior Publication Data

US 2009/0326910 A1    Dec. 31, 2009

Related U.S. Application Data

(63) Continuation of application No. PCT/JP2007/056494, filed on Mar. 27, 2007.

(51) Int. Cl.
*G06F 9/455* (2006.01)

(52) U.S. Cl.
USPC .......................................................... 703/23

(58) Field of Classification Search
USPC .......................................................... 703/23
See application file for complete search history.

(56) References Cited

U.S. PATENT DOCUMENTS

| 4,846,311 | A | 7/1989 | Thangavelu |
| 2002/0173943 | A1 | 11/2002 | Armbruster et al. |
| 2003/0233642 | A1* | 12/2003 | Hank ........................... 717/156 |
| 2007/0240117 | A1* | 10/2007 | Wiles et al. .................... 717/124 |

FOREIGN PATENT DOCUMENTS

| JP | A 2-43188 | 2/1990 |
| JP | A 2-250122 | 10/1990 |
| JP | A 2003-30269 | 1/2003 |
| JP | A 2003-167863 | 6/2003 |

OTHER PUBLICATIONS

Jose F. Morales et al., "A Generator of Efficient Abstract Machine Implementations and Its Application to Emulator Minimization," 2005, Lecture Notes in Computer Science 3668, Springer-Verlag, pp. 21-36.*
Hiroyuki Tomiyama et al., "Code placement techniques for cache miss rate reduction," 1997, ACM Transactions on Design Automation of Electronic Systems, vol. 2, No. 4, pp. 410-429.*
Susan L. Graham et al., "Gprof: A call graph execution profiler," 1982, Proceedings of the 1982 SIGPALN symposium on compiler construction, pp. 120-126.*

(Continued)

*Primary Examiner* — Kamini S Shah
*Assistant Examiner* — Russ Guill
(74) *Attorney, Agent, or Firm* — Greer Burns & Crain, Ltd.

(57) ABSTRACT

In an emulation apparatus, a processing operation recording unit records processing operations performed by an emulator executing unit and corresponding execution time. A counting unit reads policies defined in a policy storing unit and counts an execution frequency of each processing operation in each policy. According to the counting result of the counting unit, a source combining unit rearranges source components in an optimal order for each policy and combines the rearranged source components to generate a source. A compiling unit compiles the source generated for each policy and generates an emulator for each policy. An emulator selecting unit finds a policy that includes the current time from among the policies defined in the policy storing unit, reads the emulator generated for the found policy from an emulator storing unit, and instructs the emulator executing unit to execute that emulator.

8 Claims, 12 Drawing Sheets

(56) References Cited

OTHER PUBLICATIONS

Karl Pettis et al., "Profile Guided Code Positioning," 1990, Proceedings of the ACm SIGPAL 1990 Conference on Programming Language Design and Implementation, pp. 16-27.*

Wen-mei Hwu et al., "Achieving high instruction cache performance with an optimizing compiler," 1989, Proceedings of the 16th annual international symposium on Computer architecture, pp. 242-251.*

Cristina Cifuentes et al., "Walkabout—A Retargetable Dynamic Binary Translation Framework," 2002, Sun Microsystems, pp. 1-30.*

Darryl Grove, "Improving Code Layout Can Improve Application Performance," 2005, http://developers.sun.com/solaris/articles/codelayout.html, pp. 1-5.*

Gary Carleton et al., "Profile-Guided Optimizations," 1998, Dr. Dobb's Journal, vol. 23, No. 5, five pages.*

Gerolf Hoflehner et al., "Compiler optimizations for transaction processing workloads on Itanium Linux systems," 2004, Proceedings of the 37th International Symposium on Microarchitecture, eleven unnumbered pages.*

\* cited by examiner

FIG.2

| POLICY | START TIME-DATE | | | | | | | END TIME-DATE | | | | | | |
|---|---|---|---|---|---|---|---|---|---|---|---|---|---|---|
| | YEAR | MONTH | DAY | DAY OF WEEK | HOUR | MINUTE | SECOND | YEAR | MONTH | DAY | DAY OF WEEK | HOUR | MINUTE | SECOND |
| 1 | - | - | 26 | - | - | - | - | - | - | 26 | - | - | - | - |
| 2 | - | - | - | 6 | - | - | - | - | - | - | 7 | - | - | - |
| 3 | - | - | - | - | 9 | 0 | 0 | - | - | - | - | 17 | 30 | 0 |
| 4 | - | - | - | - | 17 | 30 | 0 | - | - | - | - | 9 | 0 | 0 |
| ⋮ | | | | | | | | | | | | | | |

FIG.3

SOURCE COMPONENT 1
```
PROCESSING OPERATION XXX;
switch (operand) {
```

SOURCE COMPONENT 2
```
case A: PROCESSING OPERATION A;
RECORD EXECUTION OF PROCESSING OPERATION A;
```

SOURCE COMPONENT 3
```
case B: PROCESSING OPERATION B;
RECORD EXECUTION OF PROCESSING OPERATION B;
```

SOURCE COMPONENT 4
```
case C: PROCESSING OPERATION C;
RECORD EXECUTION OF PROCESSING OPERATION C;
```

⋮

SOURCE COMPONENT n
```
}
PROCESSING OPERATION YYY;
```

| SOURCE | COMPONENT TYPE | SOURCE COMPONENT | INSERTION SOURCE COMPONENT |
|--------|----------------|------------------|----------------------------|
| 1 | FIXED | 1 | - |
| 1 | REARRANGABLE | 2, 3, 4 | 5 |
| 1 | FIXED | 6, 7 | - |
| 2 | FIXED |  | - |
| ⋮ | | | |

FIG.7

| TIME | SOURCE COMPONENT |
|---|---|
| 12/15/2006 12:00:00 | 1 |
| 12/15/2006 12:00:01 | 2 |
| 12/15/2006 12:00:02 | 1 |
| ⋮ | |

FIG.9

| POLICY | SOURCE COMPONENT | | | | |
|---|---|---|---|---|---|
| | 1 | 2 | 3 | 4 | ... |
| 1 | 100 | 20 | 0 | 5 | ... |
| 2 | 0 | 10 | 13 | 1000 | |
| 3 | 50 | 30 | 0 | 5 | |
| ⋮ | ⋮ | | | | |

EMULATION APPARATUS, EMULATOR GENERATING METHOD AND EMULATOR EXECUTING METHOD

CROSS-REFERENCE TO RELATED APPLICATION

This application is a continuation of PCT international application Ser. No. PCT/JP2007/056494 filed on Mar. 27, 2007 which designates the United States, the entire contents of which are incorporated herein by reference.

FIELD

The embodiments discussed herein are directed to an emulation apparatus, an emulator generating method and an emulator executing method.

BACKGROUND

Typically, an emulator is a software program that performs processing operations identical to a hardware component such as a central processing unit (CPU). That is, an emulator is a software program that includes description of vast processing operations originally performed by a hardware component and that emulates those processing operations. There has been a strong demand for enhancement in the processing speed of emulators and a number of studies have been undertaken to achieve the same.

For example, Japanese Laid-open Patent Publication No. 02-250122 discloses a technique of counting an instruction usage frequency of instructions emulated in an emulator and performing emulator adjustment with the use of the instruction usage frequency. Generally, in an emulator, the operation of determining the types of instructions that have been emulated (known as an instruction fetch operation) is repeated for a number of times. Thus, by counting the instruction usage frequency of instructions as disclosed in Japanese Laid-open Patent Publication No. 02-250122, the instruction fetch operation can be performed with respect to the instructions in the descending order of their instruction usage frequency. That enables enhancement in the emulator performance.

For example, consider a case when an instruction A has a usage frequency of 10% of the total instruction usage frequency, an instruction B has a usage frequency of 50% of the total instruction usage frequency, and an instruction C has a usage frequency of 20% of the total instruction usage frequency. In that case, performing the first instruction fetch operation with respect to the instruction B leads to the type determination of 50% of the total instructions. Subsequently, performing the second instruction fetch operation with respect to the instruction C leads to the type determination of 70% (=50+20) of the total instructions.

Thus, it is presumable that performing the instruction fetch operation in the descending order of instruction usage frequency results in a decrease in the number of times for which type determination is repeated in an emulator. That enables enhancement in the processing speed of the emulator. To achieve that, for example, the instruction usage frequency of instructions can be simulatedly counted in advance and the emulator can be adjusted in such a way that the instruction fetch operation is performed with respect to the instructions in the statistically descending order of their instruction usage frequency.

However, there are certain limitations on enhancing the emulator performance by simulatedly counting the instruction usage frequency. More particularly, because an emulator performs processing operations of a hardware component such as a CPU, the instruction usage frequency of instructions completely changes depending on the usage environment in which the emulator is executed. In other words, simulation does not necessarily lead to optimal emulator adjustment with respect to the usage environment in which an emulator is actually executed.

Moreover, the usage environment for an emulator is not always constant and changes significantly depending on, for example, a time period or a day of the week. However, if simulation is used to perform emulator adjustment, then the temporal changes in the usage environment are not taken into consideration. As a result, during certain time periods, an emulator may suffer performance loss such as slowdown in the processing speed thereof.

SUMMARY

According to an aspect of an embodiment of the invention, an emulation apparatus for generating an emulator by combining a plurality of source components each describing a processing operation, includes an obtaining unit that, for each time period of a plurality of time periods in which an emulator usage environment changes, obtains a count of execution frequency of the processing operation performed by the emulator; a combining unit that, according to the count of execution frequency obtained by the obtaining unit, rearranges and combines the source components to generate a source; and a compiling unit that compiles the source generated by the combining unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic diagram of exemplary policies defined in the first embodiment;

FIG. 3 is a schematic diagram of exemplary source components used in the first embodiment;

FIG. 4 is a schematic diagram of exemplary combining rules specified in the first embodiment;

FIG. 7 is a schematic diagram of exemplary processing data obtained in the first embodiment;

FIG. 9 is a schematic diagram of an exemplary counting result obtained in the first embodiment;

DESCRIPTION OF EMBODIMENTS

The gist of embodiments of the present invention is to keep a record of the execution frequency of instructions for each policy about a usage environment in which emulators are executed, generate an emulator for each policy by optimally rearranging source components according to the recorded execution frequency, and selectively execute one of the emulators depending on the current policy. Hereinafter, preferred embodiments of the present invention will be explained with reference to accompanying drawings.

Figure 1:
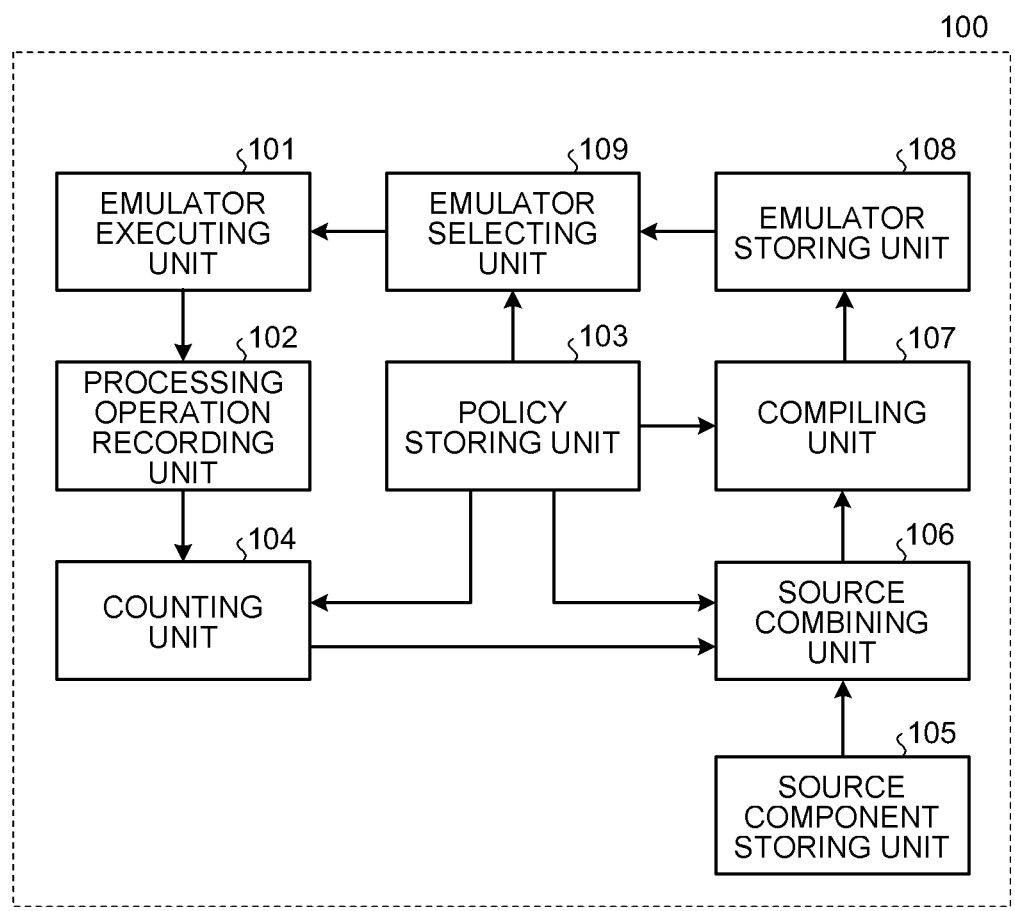
FIG. 1 is a block diagram of essential parts in an emulation apparatus according to a first embodiment.

FIG. 1 is a block diagram of essential parts in an emulation apparatus 100 according to a first embodiment. The emulation apparatus 100 includes an emulator executing unit 101, a processing operation recording unit 102, a policy storing unit 103, a counting unit 104, a source component storing unit 105, a source combining unit 106, a compiling unit 107, an emulator storing unit 108, and an emulator selecting unit 109.

The emulator executing unit 101 executes an emulator that has been selected for a particular policy by the emulator selecting unit 109. More particularly, the emulator executing unit 101 sequentially executes the instructions given in an emulator and performs processing operations of, for example, a CPU that the emulator is written to emulate.

The processing operation recording unit 102 keeps therein a record of the processing operations performed by the emulator executing unit 101 along with the time at which each processing operation is executed (hereinafter, "execution time"). More particularly, every time a processing operation, herein known as a source component that constitutes an emulator, is executed, the processing operation recording unit 102 records that processing operation (executed source components) and the corresponding execution time.

The policy storing unit 103 stores therein a plurality of policies each defined for a different usage environment in which emulators are executed. More particularly, the policy storing unit 103 stores therein certain time periods, as policies, in which the usage environment is different. For example, with reference to FIG. 2, the policy storing unit 103 stores therein a priority order of time periods each defined for a different usage environment. As depicted in FIG. 2, a policy 1 is defined as the 26-th day of each month; while a policy 2 is defined as Saturdays and Sundays. Similarly, a policy 3 is defined as a time period from 9 o'clock to 17:30 o'clock on each day; while a policy 4 is defined as a time period from 17:30 o'clock on each day to 9 o'clock on next day. Meanwhile, if, for example, the 26-th day of a month falls on a Saturday, then that day corresponds to the policy 1 and not to the policy 2 because of the priority order thereof. Moreover, because the policy 2 has a higher priority than the policies 3 and 4, the time periods defined in the policies 3 and 4 fall only on weekdays.

The counting unit 104 reads the policies defined in the policy storing unit 103 and counts an execution frequency of processing operations in each policy. That is, by referring to the execution time of each source component recorded in the processing operation recording unit 102, the counting unit 104 counts the number of source components of each type (described later) executed in each defined time period (i.e., in each defined policy).

The source component storing unit 105 stores therein the source components (or fragments of source codes) that are the processing operations constituting emulators. The stored source components include a processing operation, known as an instruction fetch operation, to determine types of instructions that have been emulated. Meanwhile, the source components are generated by, for example, dividing a software program at dividable positions as depicted in FIG. 3.

The source combining unit 106 stores therein certain combining rules that are used in generating a source, which represents the complete set of processing operations in an emulator. Depending on the combining rules, the source combining unit 106 combines some of the source components to obtain the source of an emulator. For example, the source combining unit 106 stores therein certain combining rules as depicted in FIG. 4 and combines source components 1 to 7 to generate a source 1.

In this embodiment, the source components includes fixed source components and rearrangable source components. The source combining unit 106 places the fixed source components at predetermined positions and rearranges rearrangable source components for each policy based on the counting result of the counting unit 104. That is, the source combining unit 106 rearranges the rearrangable source components for each policy in the descending order of their execution frequency. Moreover, the source combining unit 106 inserts an insertion source component between each adjacent pair of the source components.

In this way, for each policy, the source combining unit 106 combines some of the source components that have been rearranged in a certain appropriate order to generate a source that represents an emulator for the corresponding policy.

The compiling unit 107 then compiles the source for each policy and generates an emulator for that policy. More particularly, the compiling unit 107 refers to the number of policies defined in the policy storing unit 103, compiles the source corresponding to each policy, and generates an emulator for each policy.

The emulator storing unit 108 stores therein the emulators generated by the compiling unit 107 corresponding to all the defined policies.

When an emulator start instruction is invoked, the emulator selecting unit 109 finds a policy (i.e., a time period) including the current time from among the policies defined in the policy storing unit 103, reads the emulator generated for the found policy from the emulator storing unit 108, and instructs the emulator executing unit 101 to execute that emulator. Moreover, the emulator selecting unit 109 refers to a policy (i.e., a time period) that is the most immediate policy to start after the current time and performs emulator changeover setting with respect to the start time of that particular policy.

The operations performed in the emulation apparatus 100 are described below by citing concrete examples.

Figure 5:
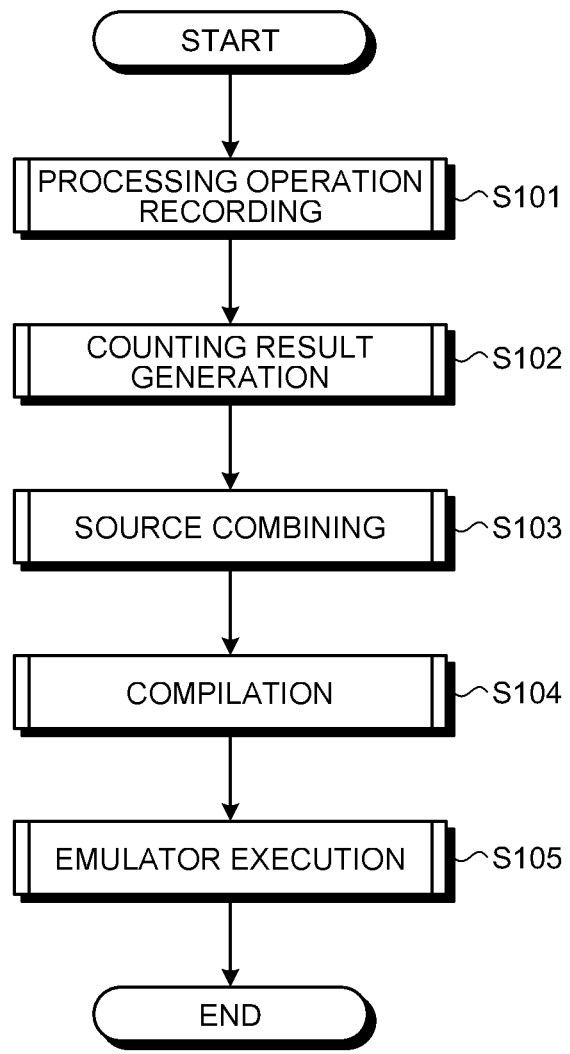
FIG. 5 is a flowchart for explaining an overview of the operations performed in the emulation apparatus.

FIG. 5 is a flowchart for explaining an overview of the operations performed in the emulation apparatus 100. First, when the emulator executing unit 101 executes an emulator as depicted in FIG. 5, the processing operation recording unit 102 records the execution time of the processing operation corresponding to each source component in that emulator (Step S101). Then, the counting unit 104 counts the execution time for each policy (Step S102).

Subsequently, the source combining unit 106 combines the source components for each policy according to the combining rules and generates the source for each policy (Step S103). At that time, based on the execution time for each policy counted by the counting unit 104, the source combining unit 106 rearranges the rearrangable source components in each policy in the descending order of their execution frequency. After the source combining unit 106 generates the source for each policy, the compiling unit 107 compiles each source and generates an emulator for each policy (Step S104). The generated emulators are stored in the emulator storing unit 108.

At the time of emulator execution, the emulator selecting unit 109 finds the policy including the current time and selects the emulator corresponding to the found policy from the emulator storing unit 108. The emulator executing unit 101 then executes the selected emulator (Step S105).

Figure 6:
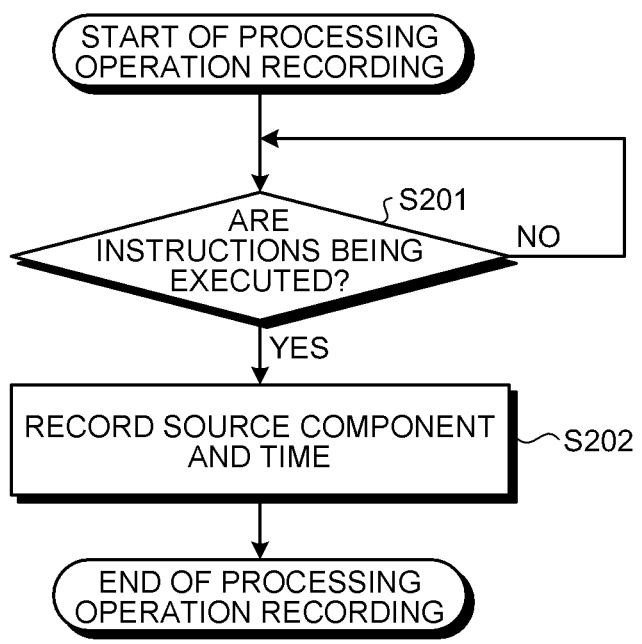
FIG. 6 is a flowchart for explaining an operation of recording execution time performed in the emulation apparatus.

FIG. 6 is a flowchart for explaining the details of the operation of recording the execution time performed by the processing operation recording unit 102 at Step S101.

In that operation, first, the processing operation recording unit 102 monitors whether the emulator executing unit 101 is executing instructions in an emulator (Step S201). If the emulator executing unit 101 is executing instructions in an emulator (Yes at Step S201), the processing operation recording unit 102 records the source component corresponding to each executed instruction along with the execution time of that instruction (Step S202). For example, when the emulator executing unit 101 executes an emulator, the processing operation recording unit 102 records the execution time for each instruction in that emulator as depicted in FIG. 7. Thus, for each executed instruction, the processing data in FIG. 7 includes the execution time of that instruction and the source component corresponding to the details of that instruction.

Figure 8:
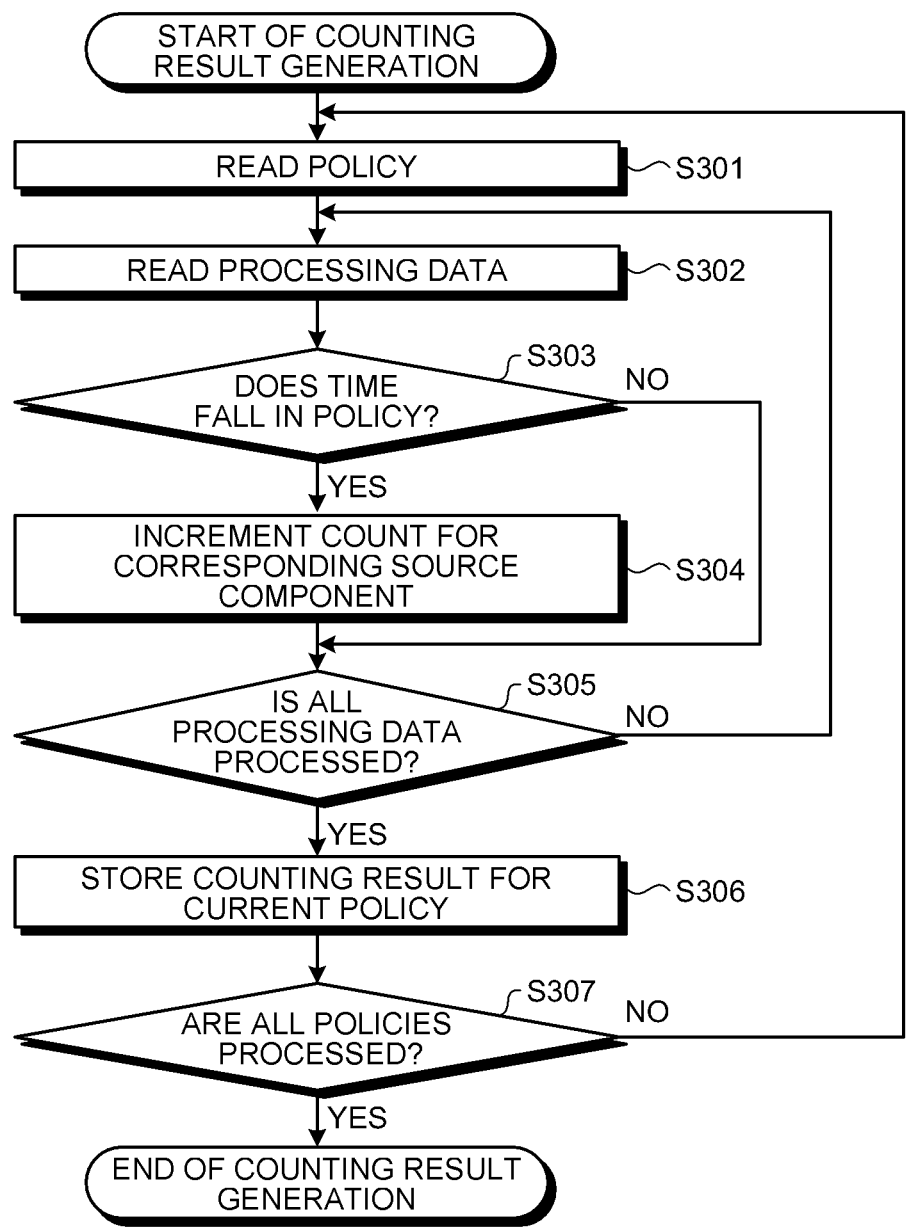
FIG. 8 is a flowchart for explaining an operation of generating a counting result performed in the emulation apparatus.

FIG. 8 is a flowchart for explaining the details of the operation of generating a counting result performed by the counting unit 104 at Step S102.

First, the counting unit 104 reads one of the policies defined in the policy storing unit 103 (Step S301) and reads the processing data for one of the instructions recorded in the processing operation recording unit 102 (Step S302). Then, the counting unit 104 determines whether the execution time in the read processing data falls in the time period defined as the read policy (Step S303). If the execution time in the read processing data falls in the time period defined as the read policy (Yes at Step S303), the counting unit 104 increments by one the execution frequency of the source component in the read processing data (Step S304).

If the execution time in the read processing data does not fall in the time period defined as the read policy (No at Step S303) or if the increment operation of the counting unit 104 (Step S304) has already been performed, the counting unit 104 determines whether the above determination operation (Step S303) is performed on the processing data of each instruction recorded in the processing operation recording unit 102 (Step S305). If the above determination operation is yet to be performed on the processing data of any instruction (No at Step S305) the counting unit 104 performs the above determination operation on the recorded processing data.

When the above determination operation is performed on the processing data recorded in the processing operation recording unit 102 (Yes at Step S305), the counting unit 104 stores therein a counting result corresponding to the currently-read policy (Step S306). That is, the counting unit 104 stores therein the execution frequency of each source component in an emulator that is executed in the time period defined as the currently-read policy. Then, the counting unit 104 determines whether the counting operation is performed for all the policies stored in the policy storing unit 103 (Step S307). If the counting operation is yet to be performed for any policy (No at Step S307), the counting unit 104 performs the above operations for that policy.

When the processing is performed for all the policies (Yes at Step S307), the counting result of the execution frequency of each source component executed in each policy is obtained. FIG. 9 is a schematic diagram of an exemplary counting result obtained by the counting unit 104. In the time period defined as the policy 1 in FIG. 9, the source component 1 is executed for 100 times, the source component 2 is executed for 20 times, and the source component 2 is executed for 5 times. Because the policies are defined in advance according to the changes in the usage environment for emulator execution, the execution frequency corresponding to each policy depicts peculiar characteristics.

Figure 10:
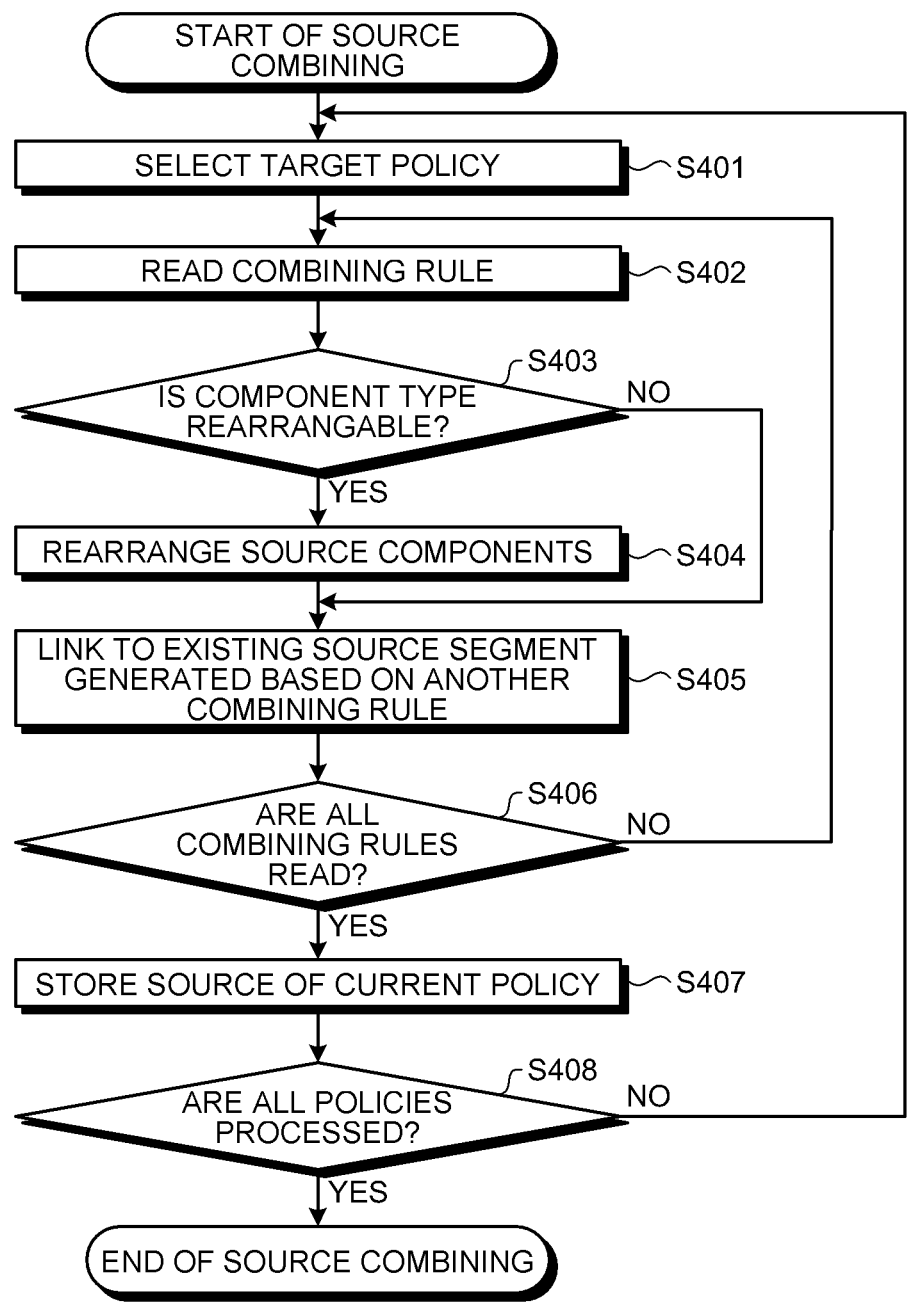
FIG. 10 is a flowchart for explaining a source combining operation performed in the emulation apparatus.

FIG. 10 is a flowchart for explaining the source combining operation performed by the source combining unit 106 at Step S103.

First, the source combining unit 106 selects one of the policies as a target policy for source generation from the policy storing unit 103 (Step S401). Then, the source combining unit 106 reads one of the combining rules (Step S402) and obtains such source components from the source component storing unit 105 for which the read combining rule specifies a combining method. A single combining rule may specify a combining method for one or more source components. By referring to the combining rule, the source combining unit 106 then determines whether the obtained source components are of the rearrangable type and thus can be rearranged in a different order (Step S403).

If the obtained source components are of the rearrangable type, the source combining unit 106 refers to the counting result in the counting unit 104 and rearranges the source components in the descending order of their execution frequency in the target policy (Step S404). For example, consider a case when, with reference to the counting result depicted in FIG. 9, the policy 1 is set as the target policy and the source components 2 to 4 are of the rearrangable type. In that case, the source combining unit 106 rearranges the source components 2 to 4 in the order of the source component 2, the source component 4, and the source component 3. Instead, if the policy 2 is set as the target policy, then the source combining unit 106 rearranges the source components 2 to 4 in the order of the source component 4, the source component 3, and the source component 2.

In this way, in the source combining operation, the order of the rearrangable source components is determined according to their usage frequency in each policy. Thus, for each time period defined as a policy, the source components are combined in an optimal order thereby enabling enhancement in the processing speed of emulators.

Upon rearranging the source components for which one of the combining rules specifies a combining method, the source combining unit 106 links the rearranged group of source components (hereinafter, "source segment") to an existing source segment (Step S405). An existing source segment refers to a rearranged group of source components that have already been rearranged according to a different one of the combining rules. Meanwhile, the source combining unit 106 links together only such source segments that constitute a single source according to the combining rules. For example, according to the combining rules depicted in FIG. 4, the source 1 is generated by linking together three source segments, namely, a source segment including the source component 1; a source segment including the source components 2, 3, and 4; and a source segment including the source components 6 and 7.

Subsequently, the source combining unit 106 determines whether the combining operation according to the combining rules is performed for all the combining rules (Step S406). If the combining operation is yet to be performed for any combining rule (No at Step S406), then the source combining unit 106 performs the combining operation for that combining rule.

Upon performing the combining operation for all the combining rules (Yes at Step S406), the source combining unit 106 stores therein the source generated corresponding to the current target policy (Step S407). That is, the source combining unit 106 stores therein the target policy and the source generated by optimally linking the source components in the target policy in a corresponding manner. Subsequently, the source combining unit 106 determines whether the source is generated corresponding to each policy stored in the policy storing unit 103 (Step S408). If the source is yet to be generated for any policy (No at Step S408), then the source combining unit 106 repeats the above processing (Steps S401 to S407) for that policy.

The generation of a source corresponding to each policy (Yes at Step S408) means that the source of an emulator corresponding to each policy is obtained. In the source corresponding to each policy, the source components executed in that policy are optimally rearranged in a descending order of their execution frequency.

Figure 11:
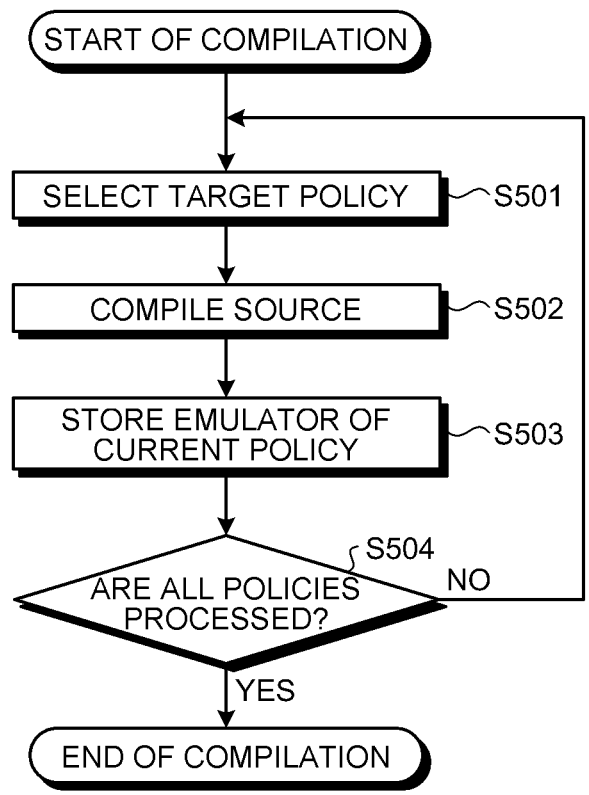
FIG. 11 is a flowchart for explaining a compiling operation performed in the emulation apparatus.

FIG. 11 is a flowchart for explaining the compiling operation performed by the compiling unit 107 at Step S104.

First, the compiling unit 107 selects one of the policies as a target policy for source compilation and emulator generation from the policy storing unit 103 (Step S501). Then, the compiling unit 107 obtains the source corresponding to the target policy from the source combining unit 106 and compiles it to generate an emulator for the target policy (Step S502).

Then, the compiling unit 107 stores the generated emulator and the target policy in a corresponding manner in the emulator storing unit 108 (Step S503). Subsequently, the compiling unit 107 determines whether an emulator is generated corresponding to each policy stored in the policy storing unit 103 (Step S504). If an emulator is yet to be generated for any policy (No at Step S504), then the compiling unit 107 repeats the above processing (Steps S501 to S504) for that policy.

Upon generating an emulator corresponding to each policy stored in the policy storing unit 103, an emulator suitable for each policy is generated (Yes at Step S504) and stored in the emulator storing unit 108.

Figure 12:
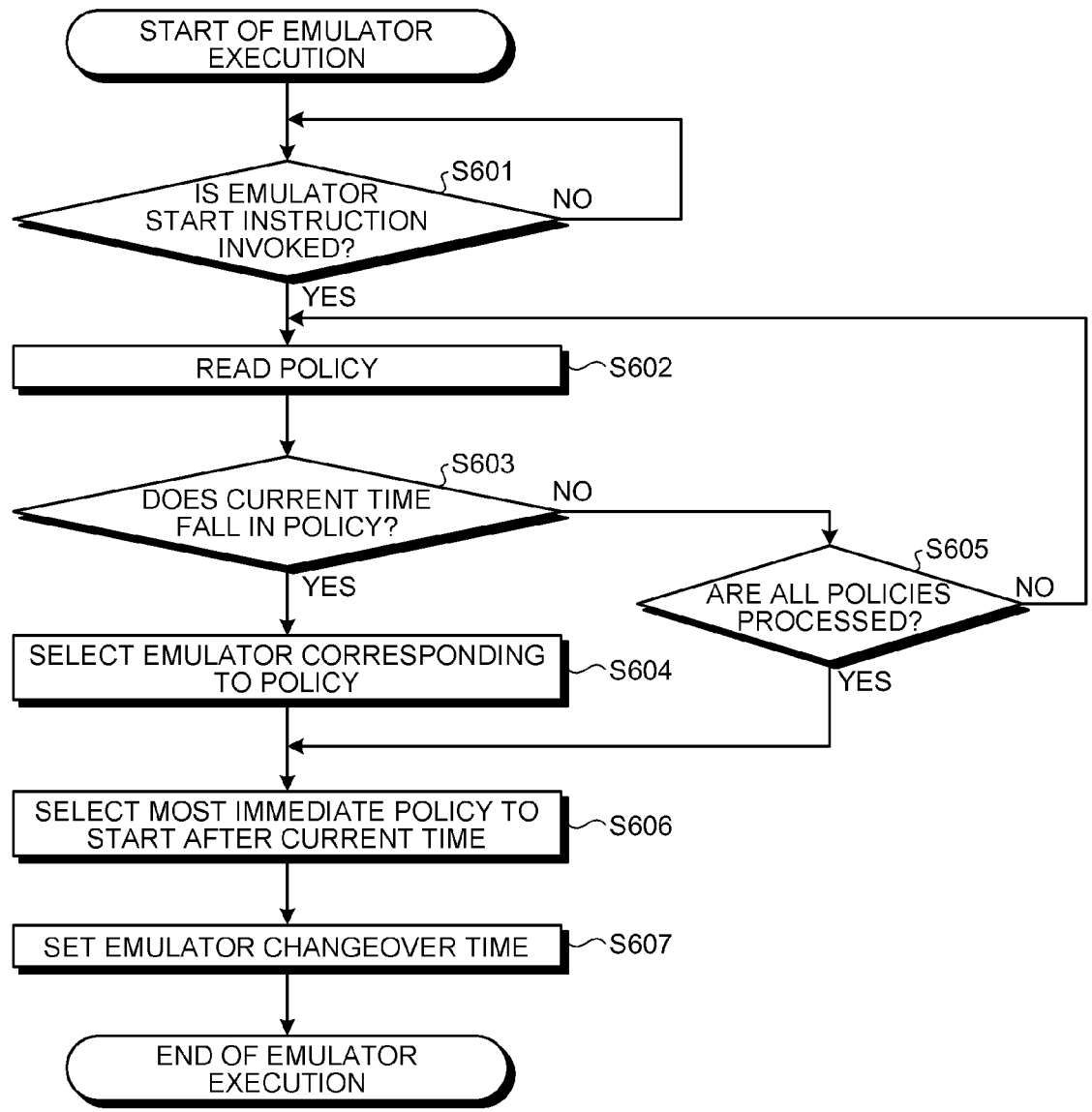
FIG. 12 is a flowchart for explaining an operation of emulator execution performed in the emulation apparatus.

FIG. 12 is a flowchart for explaining the operation of emulator execution performed by the emulator selecting unit 109 and the emulator executing unit 101 at Step S105.

First, the emulator selecting unit 109 determines whether an emulator start instruction is invoked externally (Step S601). If an emulator start instruction is invoked (Yes at Step S601), the emulator selecting unit 109 reads the policy of highest priority from the policy storing unit (Step S602) and determines whether the read policy (i.e., time period) includes the current time (Step S603).

If the read policy includes the current time (Yes at Step S603), then the emulator selecting unit 109 selects the emulator corresponding to the read policy from the emulator storing unit 108 (Step S604) and instructs the emulator executing unit 101 to execute the selected emulator. On the other hand, if the read policy does not include the current time (No at Step S603), the emulator selecting unit determines whether the comparison operation between the read policy and the current time is performed for all the policies stored in the policy storing unit 103 (Step S605). If the comparison operation is yet to be performed for any policy (No at Step S605), then the emulator selecting unit 109 reads that policy and performs the comparison operation between the read policy and the current time.

On the other hand, if the comparison operation between the read policy and the current time has been performed for all the policies (Yes at Step S605) or if an emulator corresponding to a particular policy has already been executed, then the emulator selecting unit 109 performs emulator changeover setting. More particularly, the emulator selecting unit 109 selects a policy (i.e., a time period) that is the most immediate policy to start after the current time (Step S606). The start time of the selected policy represents an emulator changeover time in the continuous execution of emulators. That is, at the start time of the selected policy, the emulator executing unit 101 needs to start executing the emulator corresponding to the selected policy.

For that, the emulator selecting unit 109 first sets the start time of the selected policy as the emulator changeover time (Step S607). Then, at the emulator changeover time, the emulator selecting unit 109 selects the emulator corresponding to the selected policy from the emulator storing unit 108 and instructs the emulator executing unit 101 to execute the newly selected emulator.

Thus, in the first embodiment, a different emulator is executed for each different time period defined as a policy. Moreover, from among a plurality of emulators generated according to the changes in the usage environment, an emulator suitable for the current time is executed. That enables reliable enhancement in the processing efficiency of emulators irrespective of the changes in the usage environment.

According to the first embodiment, for each of the policies defined according to the changes in the usage environment, an execution frequency of each processing operation in an emulator is counted. Depending on the counting result, source components that correspond to the processing operations are rearranged and combined to generate a source for each policy. The source for each policy is compiled to generate an emulator for that policy. Then, from among a plurality of emulators generated according to the changes in the usage environment, an emulator is executed that corresponds to the policy including the current time. In this way, it is possible to generate emulators according to differing execution frequencies of the processing operations in the actual usage environment and selectively execute an emulator that corresponds to the actual time of execution. That enables reliable enhancement in the processing efficiency of emulators irrespective of the changes in the usage environment.

Figure 13:
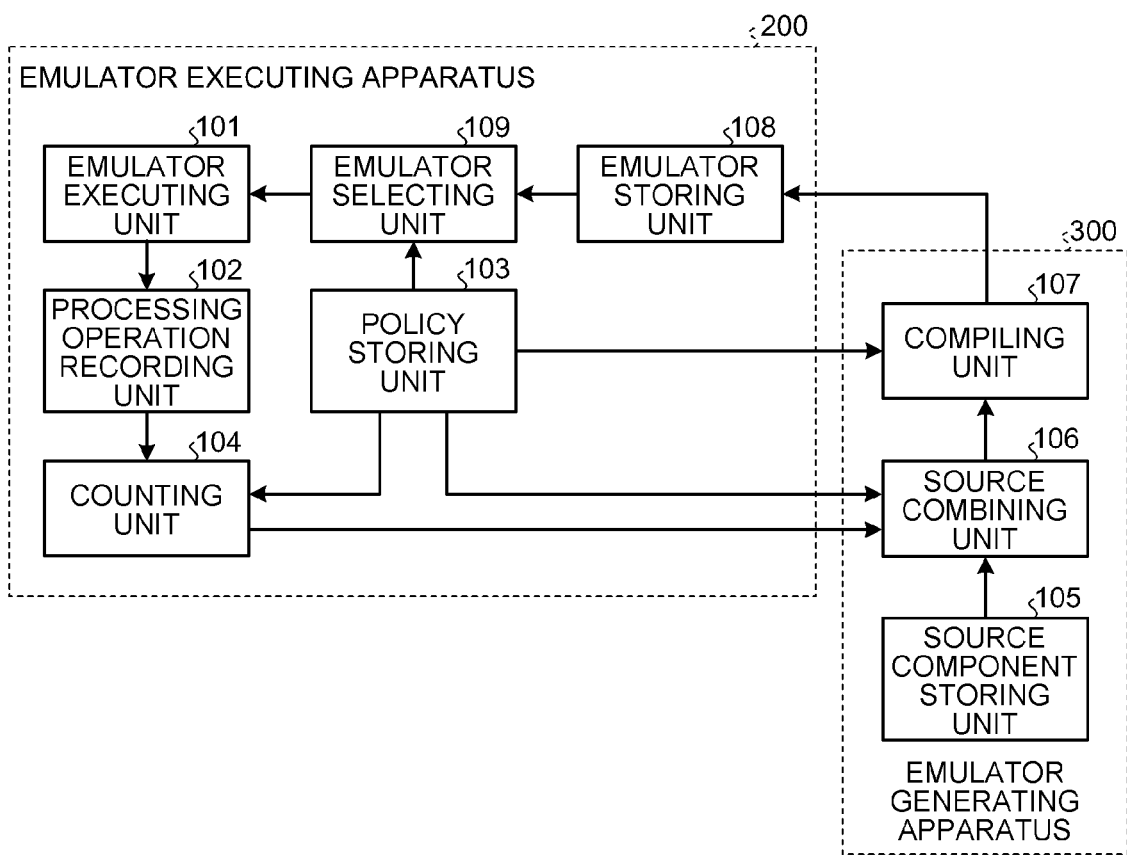
FIG. 13 is a block diagram of an exemplary system configuration of an emulation system according to a second embodiment.

Meanwhile, in the first embodiment, it is assumed that the emulation apparatus 100 singularly performs emulator generation and emulator execution. Alternatively, it is also possible to separate the emulation apparatus 100 in two apparatuses that separately perform emulator generation and emulator execution. For example, as depicted in FIG. 13, the emulation apparatus 100 may be separated in an emulator executing apparatus 200 and an emulator generating apparatus 300 that respectively perform emulator execution and emulator generation. At the time of emulator execution, the emulator executing apparatus 200 counts the execution frequency of each source component. The emulator generating apparatus 300 then generates an emulator for each policy by using the counting result and information on the defined policies. The constituent elements of the emulator executing apparatus 200 and the emulator generating apparatus 300 are identical to those depicted in FIG. 1. Hence, their description is not repeated.

In the configuration depicted in FIG. 13, the emulator generating apparatus 300 may be disposed at the customer's site while disposing the emulator executing apparatus 200 at the developer's site for developing emulators. That eliminates the need for the developer to disclose, for example, source components to the customer. Moreover, the developer may generate an emulator for each policy by obtaining necessary information from the customer.

According to the embodiments, a plurality of emulators are generated each performing processing operations in an optimal order for a corresponding time period. By executing a different emulator depending on each time period, it is possible to enhance the processing speed of emulators. That enables reliable enhancement in emulator performance irrespective of changes in a usage environment.

According to the embodiments, emulators may be generated according to execution frequencies of processing operations in the actual usage environment.

According to the embodiments, processing operations such as an instruction fetch operation are performed in a prompt manner thereby enabling reliable enhancement in the processing speed of emulators.

According to the embodiments, the processing details of source components may be used to define source components of a fixed type and source components of a rearrangable type. That enables generation of a source from a combination of fixed source components and rearrangable source components.

According to the embodiments, it is possible to selectively execute an emulator according to the actual time of execution. That enables reliable enhancement in the processing efficiency of emulators irrespective of changes in the usage environment.

According to the embodiments, it is possible to reliably select an emulator that is suitable for the actual time of execution.

According to the embodiments, emulator changeover is performed at the start time of each time period for which a suitable emulator differs. That enables selective execution of suitable emulators on a consistent basis.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present inventions have been described in detail, it should be understood that the various changes, substitutions, and alterations could be made hereto without departing from the spirit and scope of the invention.

What is claimed is:

1. An emulation apparatus for generating an emulator by combining a plurality of source components each describing a processing operation, the emulation apparatus comprising:
   a processor coupled to a memory,
   wherein:
   the memory stores policies each defined for different usage environment; and
   the processor executes the processing operation to generate the emulator by:
   obtaining, for each time period defined by the policy stored in the memory, a count of execution frequency of the processing operation performed by the emulator;
   rearranging and combining, for each policy stored in the memory and according to the count of execution frequency obtained in the obtaining, the source components to generate a source; and
   compiling, for each policy stored in the memory, the source generated at the rearranging and combining.

2. The emulation apparatus according to claim 1, wherein the obtaining includes:
   (i) executing the emulator;
   (ii) recording, when the emulator is executed at the executing, an execution time of a processing operation described by each of the source components corresponding to the emulator; and
   (iii) counting, for each time period defined by the policy stored in the memory, the execution time recorded at the recording.

3. The emulation apparatus according to claim 1, wherein the rearranging and combining rearranges, for each time period defined by the policy stored in the memory, the source components in a descending order of execution frequency of corresponding processing operations.

4. An emulation apparatus for generating an emulator by combining a plurality of source components each describing a processing operation, the emulation apparatus comprising:
   a processor coupled to a memory,
   wherein the processor executes the processing operation to generate the emulator by:
   obtaining, for each time period of a plurality of time periods, a count of execution frequency of the processing operation performed by the emulator, an emulator usage environment being different in each of the plurality of time periods;
   rearranging and combining, according to the count of execution frequency obtained in the obtaining, the source components to generate a source by referring to information regarding whether each of the source components is of a rearrangable type and, according to the count of execution frequency obtained at the obtaining, rearranging the source components of the rearrangable type; and
   compiling the source generated at the rearranging and combining.

5. An emulator generating method, executed by a computer, for generating an emulator by combining a plurality of source components each describing a processing operation, the emulator generating method comprising:
   storing, in a memory, policies each defined for different usage environment;
   obtaining, for each time period defined by the policy stored in the memory, a count of execution frequency of the processing operation performed by the emulator;
   rearranging and combining, for each policy stored in the memory and according to the count of execution frequency obtained at the obtaining, the source components to generate a source; and
   compiling, for each policy stored in the memory, the source generated at the rearranging and combining.

6. The emulator generating method according to claim 5, wherein the obtaining includes:
   (i) executing the emulator;
   (ii) recording, when the emulator is executed at the executing, an execution time of a processing operation described by each of the source components corresponding to the emulator; and
   (iii) counting, for each time period defined by the policy stored in the memory, the execution time recorded at the recording.

7. The emulator generating method according to claim 5, wherein the rearranging and combining rearranges, for each time period defined by the policy stored in the memory, the source components in a descending order of execution frequency of corresponding processing operations.

8. An emulator generating method, executed by a computer, for generating an emulator by combining a plurality of source components each describing a processing operation, the emulator generating method comprising:
   obtaining, for each time period of a plurality of time periods, a count of execution frequency of the processing operation performed by the emulator, an emulator usage environment being different in each of the plurality of time periods;

rearranging and combining the source components to generate a source by referring to information regarding whether each of the source components is of a rearrangable type and, according to the count of execution frequency obtained at the obtaining, rearranging the source components of the rearrangable type; and compiling the source generated at the rearranging and combining.

\* \* \* \* \*